United States Patent [19]

Ybern Miro

[11] Patent Number: 4,501,574
[45] Date of Patent: Feb. 26, 1985

[54] TRANSMISSION RATIO VARIATORS

[76] Inventor: Pedro Ybern Miro, C/Guipûzcoa, 159-4°, Barcelona - 20, Spain

[21] Appl. No.: 526,130

[22] Filed: Aug. 24, 1983

[30] Foreign Application Priority Data

Jul. 19, 1983 [ES] Spain .................................. 524.266

[51] Int. Cl.³ .............................................. F16H 9/02
[52] U.S. Cl. ........................................ 474/49; 474/53
[58] Field of Search .................. 474/163, 49, 52, 53, 474/54

[56] References Cited

U.S. PATENT DOCUMENTS

| | | | |
|---|---|---|---|
| 740,829 | 10/1903 | Dumaresq | 474/53 |
| 1,092,098 | 3/1914 | Fitzgerald | 474/49 X |
| 1,379,504 | 5/1921 | Young | 474/53 |
| 1,614,266 | 1/1927 | Tschappat | 474/49 |
| 2,552,179 | 5/1951 | Kamp | 474/53 |

Primary Examiner—Stephen J. Novosad
Assistant Examiner—Frank H. McKenzie, Jr.
Attorney, Agent, or Firm—Wenderoth, Lind & Ponack

[57] ABSTRACT

A transmission ratio variator establishes transmission between a drive shaft and a driven shaft between two orbital systems comprising gear wheels which move concentrically to their respective shafts and where the radii of each orbit are simultaneously variable. The gear wheels are mounted on shafts which are radially displaced in notches made in peripheric wings of sleeves joined to the control elements of the orbits. Each of the shafts of the gear wheels has a truncated thickening contained in a housing provided in each gear wheel. The shafts are axially displaced while blocked in and unblocked from the wheels depending on the direction of the displacement thereof which is controlled by a disc emerging from a ring which is displaced along the sleeve controlled by a double fork whose movement is controlled at will and is produced by conventional means.

4 Claims, 3 Drawing Figures

TRANSMISSION RATIO VARIATORS

The inventor proposed in Spanish Pat. No. 505,342 of 1981 improvements in transmission ratio variators which permit an infinite variation of the relative speeds between a driven shaft and a drive shaft within a ratio of 1:1 to a point whereat the driven shaft rotates at a greater speed than the drive shaft or vice versa. The variation in the speed between both shafts takes place continuously without steps, both in an increasing and a decreasing manner and it can be produced in one direction or another from any intermediate ratio.

Thus, the invention permits the maximum performance of an engine to be obtained by maintaining the speed of rotation of the output shaft thereof constant, while the end shaft rotates at a suitable speed, which is variable depending on the operating conditions imposed thereon.

This effect has formerly only been obtained by means of a system which, in one case, is manually operated while in the other it is automatic. We naturally refer to the gearbox with finite and rather concrete transmission ratios, causing the engine to increase and/or reduce its speed of rotation in order to cover all the needs, which are clearly achieved by sacrificing the optimum parameters and, therefore, at the expense of the consumption, effectiveness and duration of the engine.

Thus, the motor behaves in an abnormal manner, the rotation whereof having to be increased or reduced. This increases or reduces the power delivered thereby, contrary to the ideal solution of maintaining the engine at a stable operating speed achieved with a lower fuel consumption and a smoother running, which implies an almost perfect economic use.

The invention proposes an orbital system comprising two flywheels which incorporate gear wheels which are spaced from the shaft of the flywheel and form an assembly therewith.

The gear wheels of one flywheel are joined to the gear wheels of the other by simple or composite conventional transmission elements, and said gear wheels describe orbits having like or different diameters. However, the sum of the diameters thereof is always constant, since when the diameter of one of the orbits is increased, the diameter of the other decreases in a like proportion.

The previously mentioned flywheels are comprised of sleeves which enclose the shafts resting on supports along which they move axially, while the sleeves are fixed.

The shafts are provided in the part enclosed by the sleeve, with a thickening, the major part of which is truncated and the side surface thereof forms an inclined plane which constitutes a strip acting as an operating wedge which determines the orbits of the gear wheels.

On the outside of the sleeves there are periferic wings between which the shafts of the gear wheels are disposed. This movable joining has a radial displacement with respect to the shaft and, hence, the wings of the sleeves are provided with a plurality of faced radial notches in which there are guided the shafts on which there rest the gear wheels which move when the thickened shaft and the sleeve turn in unison joined by keys which, nevertheless, permit the thickened shaft, turning on its supports, to move axially along the inside of the sleeve.

Between the wings of each one of the sleeves, there is provided as many holes as gear wheels which pass to the interior and are located about the truncated thickening of the shaft. These holes are in alignment with the notches, and the notches of one wing face those of the other wing in perfect alignment to permit the shafts of the gear wheels to be operated, as will subsequently be described.

The shafts of the gear wheels are arranged on forks between whose arms there prolong the radial supports, which, through the holes of the sleeves, contact the truncated thickening of the respective shafts. Thus, when one shaft is moved axially within its sleeve, the radial supports follow the side surface of the thickening, adapting to the diameter thereof, wherefore the diameter of the orbit in which the gear wheels move is varied.

The described variation is possible since the ends of the shafts of the gear wheels move along the radial notches made in the peripheric wings of the sleeve.

Thus, the radial position of the shafts, i.e. the distance between the centre of the shaft on which the gear wheel rests and the centre of the thickened shaft, is determined by the position of the truncated thickening with respect to the radial supports.

The gear wheels of one of the sleeves are joined to the gear wheels of the other sleeve by means of belts, chains, cog belts or any other conventional means. However practice preferably advises the use of cog belts with reinforced inner cores.

When one of the shafts rotate the other shaft is forced to rotate. If the orbital diameters are alike, the speeds of one shaft and the other are also alike, but if the shafts are moved varying the support of the gear wheels, a variation of the speed between one shaft and the other will be obtained. The means used for this variation to be identical in one shaft and the other, so that the sum of the radii of both orbits are always the same, can be automatic or manual, purely mechanically operated or electromechanically, electronically, pneumatically or hydraulically controlled or combined means, depending on whether the assembly is used with a drive system having a specific nature.

The invention can be summarized as merely consisting in establishing the transmission between a driven shaft and a drive shaft by means of two orbital systems comprising gear wheels which move concentric to the respective shafts thereof, joining one orbital system to the other by simple or composite conventional transmission elements; the radii of each orbit being variable simultaneously by maintaining the sum thereof constant, each one of the shafts being provided with an identical truncated thickening, which are in a direct position and which, acting as a wedge, contact the radial supports which are guided in holes provided in a sleeve which equally spaced from the holes is provided at the outer part thereof with peripheric wings perpendicular to the shaft, which wings are provided with radial notches in which there are guided shafts on which there rest the gear wheels which move when the thickened shaft and the sleeve rotate in unison joined by keys.

The shafts of the gear wheels are arranged on forks between the arms of which there prolong the radial supports which, through the holes of the sleeve, contact the truncated thickening of the shaft, which is movable in a direction opposite to that of the other shaft, proportionally varying the radius of contact of the radial supports in one shaft which respect to the other, maintaining the sum of both radii constant.

The ends of the shafts of the gear wheels move along the radial notches made in the peripheric wings of the sleeve, constituting the points of transmission of the movement. The radial position of the shafts of the gear wheels is determined by the position of the truncated thickening of the shaft with respect to the radial supports, the position of the thickenings being determined by a mechanical element comprised of a double fork which oscillates at its mid point and is conventionally activated.

Between each one of the gear wheels and the shaft thereof, there is provided an adjustable tension clutch which constitutes a limiting element in the torque to be transmitted.

The sleeve is encircled by a ring slidable about a cylindrical section made in the sleeve. Said ring incorporates a brake lining disc having by-pass holes to stems securely fixed to one of the wings of the sleeve and, with the help of an adjustable tension spring, presses on planes protruding from the shafts of the gear wheels, blocking or freeing them. The rings of both sleeves are controlled by a double fork activated by conventional means which act on a lateral strip emerging from the ring, at the edge opposite to the disc.

Thus, practice has demonstrated that the adjustable tension clutch provided in each of the gear wheels and the brake lining disc which acts simultaneously in all clutches are a source of problems, they complicate the mechanical construction of the assembly, they require a permanent maintenance and make the product expensive, without proportioning an absolute reliability in functioning.

However, it is absolutely necessary for the gear wheels to rotate freely, without transmitting a force each time the orbit is altered, that is each time the transmission ratio is modified and in contrary they become securely fixed in the shaft thereof when they transmit a force.

Furthermore, the gear wheels should necessarily be slaves of their orbit and, therefore, they should smoothly and surely follow the truncated thickenings of the shaft.

Besides, there has been discovered the need to increase as much as possible the number of gear wheels which are in contact with the transmission means, exceeding a working arc of more than 180° per orbit so that the theoretic limit of the power to be transmitted increases.

These important details have been taken down by the inventor as basic objects to be solved so that his invention reaches the initially contemplated object and the solution thereof constitutes the object of this invention introducing further improvements in the improvements in transmission ratio variators of Spanish Pat. No. 505,342.

In accordance with the improvements of this invention a higher mechanical reliability, a smoother and a more precise functioning are obtained, thereby increasing the transmitted power and facilitating handling and reducing costs.

Furthermore, it should be pointed out that assembly is simplified and the dimensional reduction of the assembly is permitted, adapting it to low powers so that it can be used in a high number of cases.

According to the invention, each one of the gear wheels rotates on an axially displaceable shaft and each of these shafts have a truncated thickening which fits into a housing likewise provided in the core of the wheel.

Since the wheel is axially fixed, the shaft in one of the positions in which it can be displaced, is locked in the wheel and blocks it, while in a contrary displacement it is unlocked and allows the gear wheel to be free.

Each one of the shafts prolong into a stem and this tem is joined to a ring which is slidable about the cylindrical path incorporated in the sleeve, replacing the anti-skid lining contemplated in Spanish Pat. No. 505,342.

Thus, the slidable ring incorporates a disc provided with radial notches through which there pass the stems which, joined to the disc, are displaced therewith locking or freeing the gear wheels.

Between the plate incorporating the slidable ring and the adjacent wing of the sleeve, there are separating elements which are joined to the stems which, provided with outer heads, are hauled by the disc without being locked therein, that is enabling freedom of displacement along the notches.

The slidable ring has, at the edge opposite to the disc, a flange which is located between the arms of the fork provided with rollers. This fork is double and acts simultaneously in the driver shaft and the driven shaft so that both orbital systems are blocked or freed at the same time.

So that both orbital systems are more docile in their following along the respective cams, there have been provided radial tightening elements which, preferably, are comprised of reinforcements which encircle the forks on which the gear wheels are supported. These reinforcements have an elastic nature and can be metallic obtained, for example, from helicoidal traction springs.

Finally, so that the cog wheel may encircle a higher number of gear wheels, there is provided an idler which, located between both orbital systems, furthermore permits the initial tension of the belt to be adjusted.

To conveniently illustrate the aforegoing, three sheets of drawings are accompanied representing schematically a mode of embodiment, purely illustrative and not limiting of the possibilities of the invention.

Figure 1:
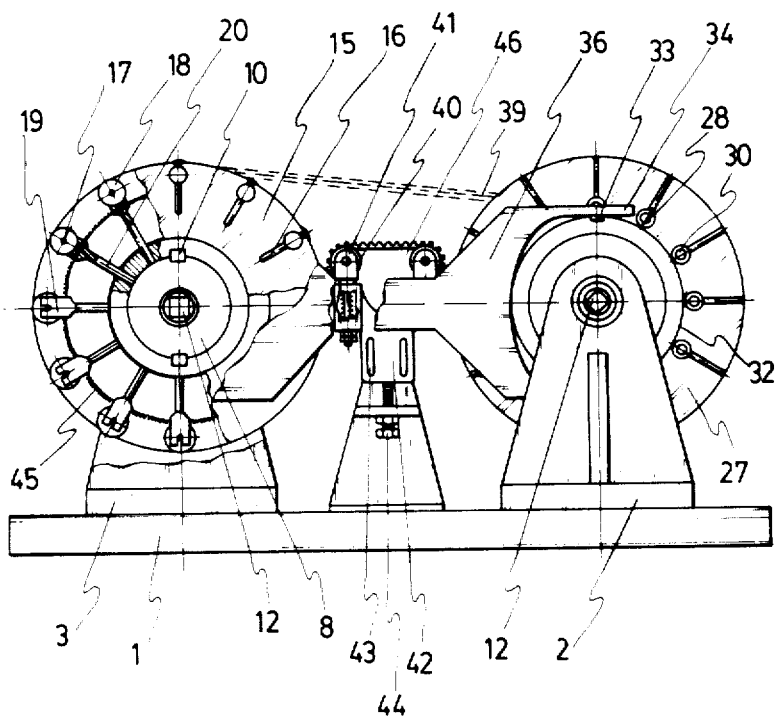
FIG. 1 represents an elevational view partially cut to illustrate the hidden parts.
Figure 2:
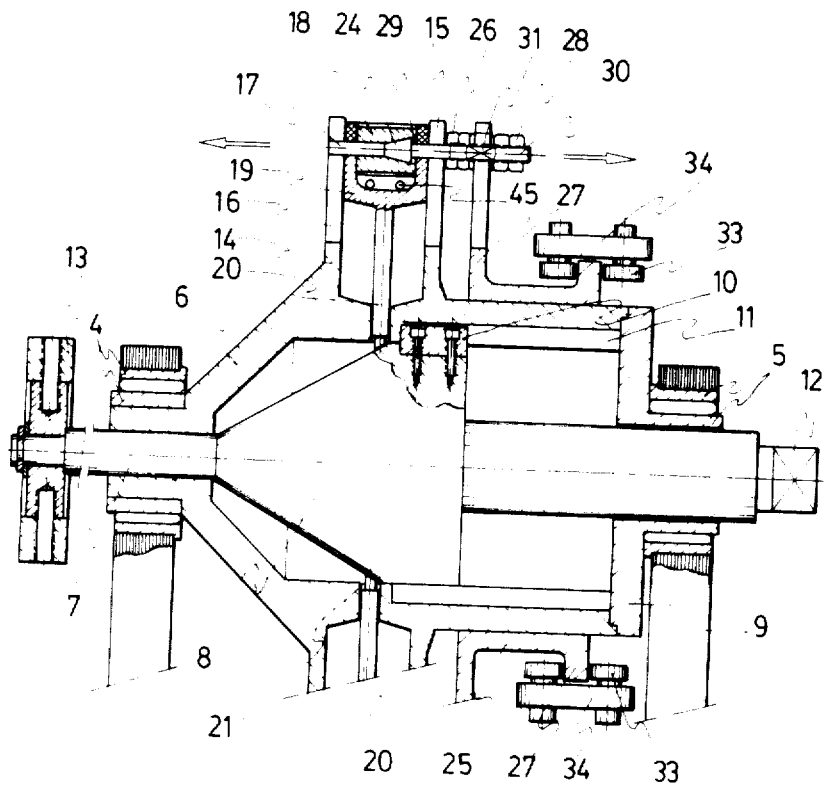
FIG. 2 represents a partial detail of one of the orbital systems.

Referring to the drawings, it can be seen that on a base plate 1 there are disposed two sub-bases comprised of the laterals 2 and 3 along which the bearings 4 and 5 move. The sleeve 6, at one side, adjusts to the bearing 4, while the other side thereof adjusts to the bearing 5, and in the inside of the sleeve there is incorporated the thickened shaft 7 whose thickening 8 serves as a wedge; the sleeve 6 is hollow and is connected at its cover 9 to the bearing 5.

Between the sleeve 6 and the thickened shaft 7 there are disposed the keys 10 which move in the corresponding grooves 11 thereof, wherefore there is permitted an axial movement of the shaft 7, the radial connection thereof not being lost.

The shaft 7 is provided with a power take-off coupling 12 and the opposite end is provided with a head 13 for the control or activating element.

The sleeve 6 is provided with two peripheric wings 14 and 15 which are affected by the radial notches 16 in which there are guided the shafts 17 on which there rest the gear wheels 18 which move when the shaft 7 and its sleeve 6 turn in unison joined by the keys 10 thereof.

The shafts 17 of the gear wheels 18 are arranged on forks 19 between the arms of which there prolong the radial supports 20 which, through the holes 21 provided in the sleeve 6, contact the truncated thickening 8 of the shaft 7.

Said shafts 7 are arranged in parallel and the mechanical system which produces the axial, opposite and simultaneous movements thereof guarantee that the orbital increase of a gear wheel assembly 18 is equal to the reduction of the other, so that the development is constant.

Figure 3:
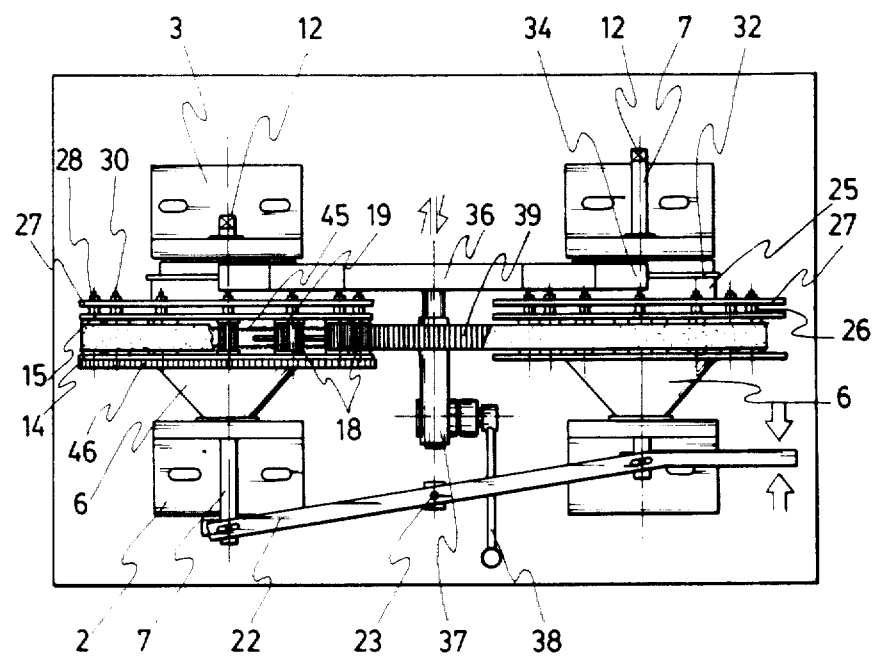
FIG. 3 represents a plan view.

In accordance with the drawings and more specifically as illustrated in FIG. 3, the position of the truncated thickenings 8 with respect to the supports 20 is determined by a double fork 22 which oscillates at its midpoint 23 and is activated by conventional means which, to simplify the drawings, have not been represented but act in one direction or the other as indicated by the arrows.

The shaft of each of the gear wheels 18 has a truncated thickening 24 which is housed in a notch 29 provided in the gear wheel 18, each shaft prolongs into a stem 30 having an anti-rotating zone 31. Said stem 30 is threaded and by the separators 26 and the heads 28 is joined to the disc 27 which is provided with slit holes through which the stems, at their anti-rotating zone 31, are displaced radially to the disc 27 which is part of the slidable ring 25.

Both rings 25 incorporate an operating flange 32 opposite to disc 27 and at this flange 32 which is located between the rollers 33 of each arm 34 of a double fork 36 which, by means of a rack and pinion mechanism 37 activated by a lever 38, moves in the direction indicated by the arrows, blocking and freeing the truncated thickenings 24 from the housings 29 provided in the rollers 18.

It should be pointed out that the rack and pinion mechanism is not fundamental and can advantageously be replaced by hydraulic or pneumatic activating means. However, in the embodiments of the prototypes put into practice using the invention, a mechanical activator was employed since it was simpler.

Thus, the cog wheel 39 joins both orbital systems and is operated by the rollers 40 so that it acts on the higher number of gear wheels 18 increasing the transmitted power; these gear wheels are mounted on floating supports 41 and are supported on the plate 42 which, due to the slit holes 43 and the adjusting element 44, permit the suitable initial tension to be established. The hollow 46 of the plate 42 frees the passage for the activating system of the double fork 36.

The forks 20 which continuously follow the cam profile 8 are helped by the elastic reinforcements 45, so that these are urged at a constant tension.

As illustrated in FIG. 3 one of the orbital systems, the driver, has the crown 46 constituting the power take-off.

Having reflected the basis of the invention in the drawings, it consists in establishing the transmission between a drive shaft 7 and a driven shaft 7 by the orbital systems of gear wheels 18 which move concentric to the respective shafts 7 thereof, one orbital system being joined to the other by conventional transmission means 30, simple or composite, the radii of each orbit being variable simultaneously by maintaining the sum thereof constant, wherefore the transmission ratio is variable without steps both in an increasing (by multiplying) and in a decreasing (by dividing) manner within a limit determined by the maximum orbital radius of one system with respect to the minimum orbital radius of the other system.

According to the aforegoing, one of the coupling heads 12 incorporates the output of the drive shaft while the other is connected to the input of the mechanism to be moved. Said mechanism could, as mentioned, be any system which requires a variable speed of rotation, such as for example, the propeller of a ship, a variable flow pump, a dynamo, a tool, an agricultural implement, the transmission of a wheel of a vehicle, a conveyor belt, etc.

Once the shafts are connected and the drive element is in motion, both orbital systems start to rotate and, if the orbital diameters are alike, the number of input turns will be equal to the number of output turns.

However, when operating in any one of the directions indicated by the arrows, on the arm of the double fork 22, one of the shafts 7 will be introduced through one side while it will be extracted through the other side with a like proportion. Precisely at this instant the position of the thickenings 8 is being varied and since the gear wheels 18 are free, inasmuch as the thickening 24 has been freed by the displacement of the disc 27 after activation of the arm of the lever 38 which motivates the outward displacement of the ring 25, by the activation of the forks 34, the shafts 17 free the rollers and the orbits thereof are varied positionally by the wedges constituted by the thickenings 8 on which the supports 20 of the forks 19 act.

The transmission element 39 always acts on the corresponding gear wheels 18 and the operating smoothness is insured by the free turn of the gear wheels; when the desired transmission ratio is reached, the arm of the lever 38 returns to its operating position and a new blocking of the shafts 17 is produced, fixing the orbit and, therefore, the new transmission ratio.

A simple manner of resolving the operation of the double fork 32 is through a hydraulic or pneumatic dual-effect cylinder. A manually operated drum will also serve. In any of the cases, a sensitive control element is required which can readily be controlled to effect the operation smoothly.

As explained, the operation is very simple, it can be carried out rapidly and, therefore, the continuous variation in speed is carried out with absolute reliability, without pulls nor sharpness, maintaining constant the tension of the transmission element between both orbital systems and perfectly controlling the effects obtained.

With the help of the electronic elements the system can be automatized so that the number of output turns per minute is constant without having to act on the engine, so that same operates at a constant rythym under the best performance conditions.

What is claimed is:

1. Improvements in transmission ratio variators wherein there is established the transmission between a drive shaft and a driven shaft between two orbital systems comprising gear wheels which move concentrically to their respective shafts and where the radii of each orbit are simultaneously variable, the gear wheels being mounted on shafts which are radially displaced in notches made in peripheric wings of sleeves joined to the control elements of the orbits, characterised in that each of the shafts of the gear wheels has a truncated thickening contained in a housing provided in each gear wheel, and said shafts are axially displaced being blocked in and unblocked from the wheels depending on the direction of the displacement thereof which is controlled by a disc emerging from a ring which is displaced along the sleeve controlled by a double fork whose movement is controlled at will and is produced by conventional means.

2. Improvements in transmission ratio variators according to claim 1, characterised in that the disc has a number of radial notches, equal to the number of shafts, and these are radially blocked in the notches which move in accordance with the orbit alterations of the gear wheels, the ring being provided with an operating flange opposite to the disc which is located between the arms of the fork and contained between rollers, so that the displacement of the double fork determines the displacement of the ring.

3. Improvements in transmission ratio variators according to claim 1, characterised in that a cog wheel which acts as a transmission element is operated by rollers which determine an operating arc greater than 180°, the rollers being arranged on floating supports which are supported by a plate which can be adjusted and positionally fixed to establish the initial tension of the wheel.

4. Improvements in transmission ratio variators according to claim 1, characterised in that the gear wheels are acted upon by reinforcements which encircle the forks in which said wheels are supported determining the movement of a wedge which controls the orbit changes.

* * * * *